(12) United States Patent
Toji (10) Patent No.: US 12,394,184 B2
(45) Date of Patent: Aug. 19, 2025

(54) DATA COLLECTION DEVICE AND DATA COLLECTION METHOD

(71) Applicant: Konica Minolta, Inc., Tokyo (JP)

(72) Inventor: Bumpei Toji, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 394 days.

(21) Appl. No.: 18/002,534

(22) PCT Filed: Jun. 16, 2021

(86) PCT No.: PCT/JP2021/022779
§ 371 (c)(1),
(2) Date: Dec. 20, 2022

(87) PCT Pub. No.: WO2022/004370
PCT Pub. Date: Jan. 6, 2022

(65) Prior Publication Data
US 2023/0245428 A1 Aug. 3, 2023

(30) Foreign Application Priority Data
Jul. 3, 2020 (JP) .................. 2020-115540

(51) Int. Cl.
*G06V 10/774* (2022.01)
*G06V 10/74* (2022.01)
*G06V 10/82* (2022.01)

(52) U.S. Cl.
CPC .......... *G06V 10/774* (2022.01); *G06V 10/761* (2022.01); *G06V 10/82* (2022.01)

(58) Field of Classification Search
None
See application file for complete search history.

(56) References Cited

U.S. PATENT DOCUMENTS

| 10,311,335 B1 * | 6/2019 | Kim | G06V 20/10 |
| 2019/0065995 A1 | 2/2019 | Takayama et al. | |
| 2021/0056404 A1 * | 2/2021 | Goswami | G06F 18/22 |

FOREIGN PATENT DOCUMENTS

| JP | H05-061843 A | 3/1993 |
| JP | 2012-252507 A | 12/2012 |
| JP | 2018-169752 A | 11/2018 |
| JP | 2019-003554 A | 1/2019 |

(Continued)

OTHER PUBLICATIONS

International Search Report and Written Opinion for the corresponding patent application No. PCT/JP2021/022779 dated Jul. 27, 2021, with English translation.

(Continued)

*Primary Examiner* — Leon Flores
(74) *Attorney, Agent, or Firm* — LUCAS & MERCANTI, LLP (57) ABSTRACT

Provide a data collection device capable of reducing the burden on a user associated with generating training data for a data recognition model. A data collection device includes a first CNN, a second CNN, a comparison unit that compares a recognition result for input data by the first CNN to a recognition result for the input data by the second CNN, and a data collection unit that collects the input data as training data according to a comparison result of the comparison unit.

21 Claims, 8 Drawing Sheets

(56) References Cited

FOREIGN PATENT DOCUMENTS

| JP | 2019-046094 A | 3/2019 |
| JP | 2019-215705 A | 12/2019 |
| JP | 2020-009141 A | 1/2020 |
| JP | 2020-052484 A | 4/2020 |

OTHER PUBLICATIONS

Notice of Reasons for Refusal dated Jul. 30, 2024, issued for the corresponding Japanese Patent Application No. 2022-533823, 11 pages, with English Translation.
Decision of Refusal, issued on Jan. 14, 2025 for the corresponding Japanese Patent Application No. 2022-533823, 8 pages, with English translation.

* cited by examiner

FIG. 2

FIG. 3A $y=f(X)$
$X=\sum_{i=1}^{n}(SUwi \times xi)$

FIG. 3B

| Training parameters | |
|---|---|
| Neuron information | |
| Neuron number | Neuron weight |
| 1 | S1w1,⋯S1wi,⋯S1wn |
| 2 | S2w1,⋯S2wi,⋯S2wn |
| ⋮ | ⋮ |

FIG. 4A

→ Forward propagation
←------- Back propagation

FIG. 4B

→ Forward propagation

DATA COLLECTION DEVICE AND DATA COLLECTION METHOD

CROSS REFERENCE TO RELATED APPLICATION

This Application is a 371 of PCT/JP2021/022779 filed on Jun. 16, 2021, which, in turn, claims priority of Japanese Patent Application No. 2020-115540 filed on Jul. 3, 2020, and the above applications are incorporated herein by reference.

TECHNICAL FIELD

The present disclosure relates to technology for collecting training data used for training a data recognition model.

BACKGROUND ART

Conventionally, an image recognition system is known that recognizes a position and state of an object such as a person or car from an image, using machine learning.

For example, according to Patent Literature 1, a method has been proposed to execute training specialized for an installation site by adding an environment-dependent attribute corresponding to the installation site to training data, and executing the training using the training data that includes the environment-dependent attribute.

CITATION LIST

Patent Literature

[Patent Literature 1] Japanese Patent Application Publication No.: 2012-252507

SUMMARY OF INVENTION

Technical Problem

According to Patent Literature 1, in order to generate training data, a user needs to assign correct answers to images taken at an installation site. However, in order to improve recognition performance of a data recognition model, a large amount of training data is required, and in order to prepare a sufficient amount of training data for each of multiple installation sites, this becomes a problem in that a huge amount of work is required from a user.

A similar problem also exists when speech recognition or natural language processing using machine learning is executed.

The present disclosure is made in view of the above technical problems, and an object of the present disclosure is to provide a data collection device and a data collection method that can reduce user burden associated with generating training data for a data recognition model.

Solution to Problem

A data collection device according to an aspect of the present disclosure collects training data for a data recognition model, the data collection device comprising: a first recognition unit; a second recognition unit that is different from the first recognition unit; a comparison unit that compares a recognition result for input data by the first recognition unit to a recognition result for the input data by the second recognition unit; and a collection unit that collects the input data as training data according to a comparison result of the comparison unit.

According to at least one embodiment, computational scale of the first recognition unit is smaller than computational scale of the second recognition unit.

According to at least one embodiment, the collection unit collects the recognition result of the second recognition unit as training data, the training data indicating labeled data associated with the input data.

According to at least one embodiment, the data collection device further comprises a training unit that executes additional training of the first recognition unit using the training data collected by the collection unit.

According to at least one embodiment, the training unit corrects the labeled data according to an external input.

According to at least one embodiment, the comparison unit determines whether or not the recognition result of the first recognition unit and the recognition result of the second recognition unit are different, and the collection unit collects the input data as the training data when the recognition result of the first recognition unit and the recognition result of the second recognition unit are different.

According to at least one embodiment, the comparison unit determines whether or not a difference between the recognition result of the first recognition unit and the recognition result of the second recognition unit is equal to or greater than a defined threshold, and the collection unit collects the input data as the training data when the difference is equal to or greater than the threshold.

According to at least one embodiment, a timing determination unit that determines a timing of operation of the second recognition unit, wherein the first recognition unit regularly executes data recognition, and the second recognition unit executes data recognition at a timing determined by the timing determination unit.

According to at least one embodiment, the timing determination unit determines the timing at fixed intervals.

According to at least one embodiment, the timing determination unit determines the timing according to a training proficiency level of the first recognition unit.

According to at least one embodiment, the timing determination unit determines the timing according to an external input.

According to at least one embodiment, the data collection device further comprises an edge terminal comprising the first recognition unit; and a server terminal comprising the second recognition unit.

According to at least one embodiment, the data collection device further comprises at least one second edge terminal, the second edge terminal comprising a recognition unit that has the same configuration as the first recognition unit.

According to at least one embodiment, the first recognition unit and the second recognition unit execute image recognition, speech recognition, or natural language recognition.

A data collection method according an aspect of the present disclosure collects training data for a data recognition model, the data collection method comprising: a first recognition step of obtaining a recognition result for input data by a first recognition unit; a second recognition step of obtaining a recognition result for the input data by a second recognition unit different from the first recognition unit; a comparison step of comparing the recognition result of the first recognition unit to the recognition result of the second recognition unit; and a collection step of collecting the input data as training data according to a comparison result of the comparison step.

According to at least one embodiment, computational scale of the first recognition unit is smaller than computational scale of the second recognition unit.

According to at least one embodiment, the collection step collects the recognition result of the second recognition unit as training data, the training data indicating labeled data associated with the input data.

According to at least one embodiment, the data collection method further comprises additional training of the first recognition unit, executed using the training data collected in the collection step.

According to at least one embodiment, the comparison step determines whether or not the recognition result of the first recognition unit and the recognition result of the second recognition unit are different, and the collection step collects the input data as the training data when the recognition result of the first recognition unit and the recognition result of the second recognition unit are different.

According to at least one embodiment, the comparison step determines whether or not a difference between the recognition result of the first recognition unit and the recognition result of the second recognition unit is equal to or greater than a defined threshold, and the collection step collects the input data as the training data when the difference is equal to or greater than the threshold.

According to at least one embodiment, the first recognition unit regularly executes data recognition, and the second recognition unit executes data recognition at a defined timing.

Advantageous Effects of Invention

When there are recognition results from a first recognition unit and a second recognition unit, and recognition results from one recognition unit are correct and results from the other are wrong, input data for the wrong recognition unit is classified into false positive (FP) or false negative (FN). Here, FP means that input data does not contain a detection target, but is identified as including a detection target, while FN means that input data contains a detection target, but is identified as not including a detection target. In general, an object of training in data recognition is to reduce such FP and FN results. An effective method for reducing FP and FN results is add correct answers to data classified as FP or FN, generate training data, and execute additional training, such that correct recognition can be achieved with similar data. According to a data collection device of the present disclosure, such data classified as FP or FN can be easily collected as training data. Further, regarding correct answers, a user does not have to manually assign a correct answer and can instead use recognition results from a recognition unit that gave a correct answer. Therefore, user burden related to the generation of training data can be reduced.

DESCRIPTION OF EMBODIMENTS

1. Embodiment 1

An image recognition system 1 according to Embodiment 1 is described below.

1.1. Structure

Figure 1:
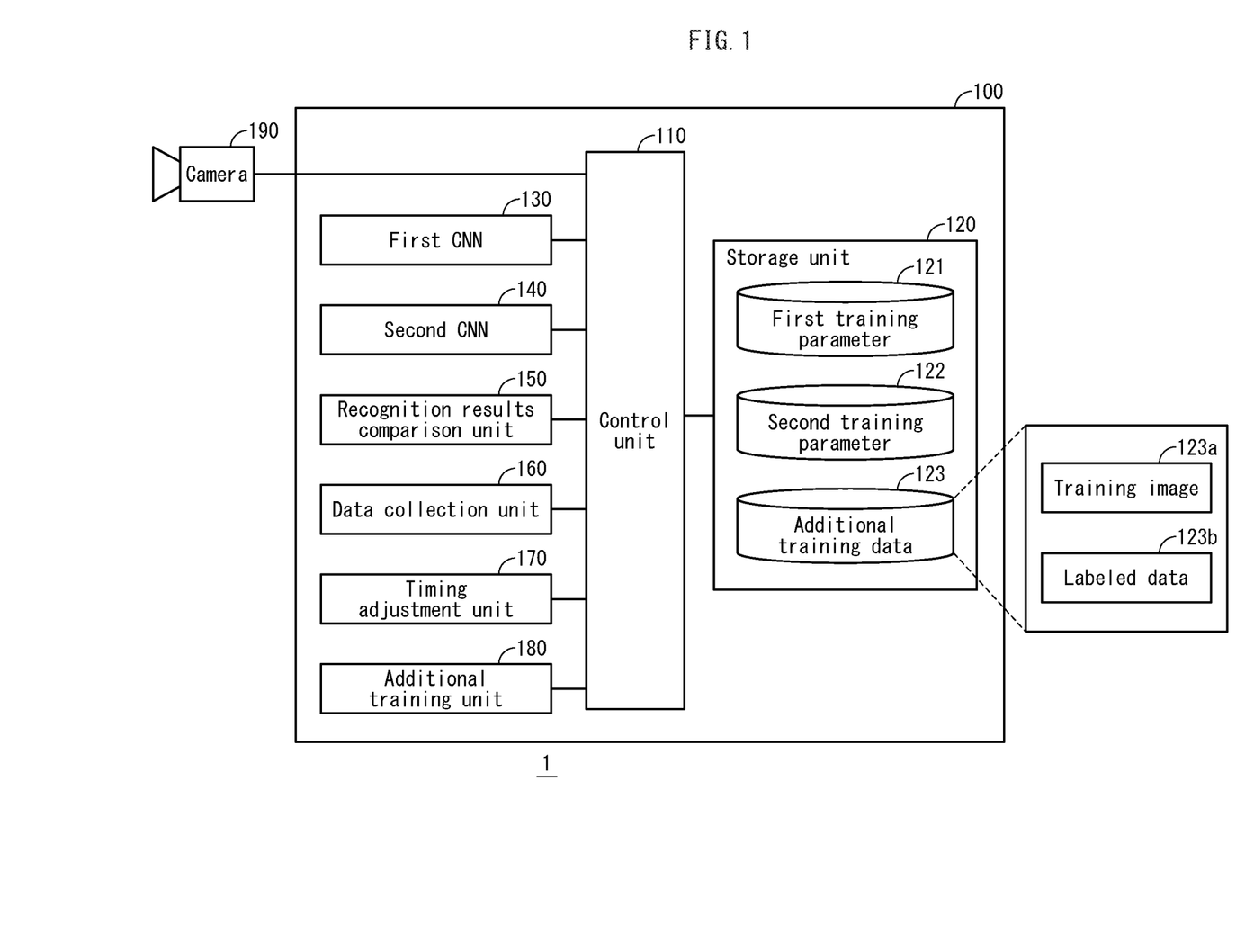
FIG. 1 is a block diagram illustrating structure of an image recognition system 1.

FIG. 1 is a block diagram illustrating structure of the image recognition system 1. As illustrated, the image recognition system 1 includes an image recognition device 100 and a camera 190. The image recognition device 100 includes a control unit 110, a non-volatile storage unit 120, a first CNN 130 (first recognition unit), a second CNN 140 (second recognition unit), a recognition results comparison unit 150 (comparison unit), a data collection unit 160 (collection unit), a timing adjustment unit 170 (timing determination unit), and an additional training unit 180 (training unit).

Here, the first CNN 130, the second CNN 140, the recognition results comparison unit 150, the data collection unit 160, the timing adjustment unit 170, and the additional training unit 180 constitute a data collection device.

The camera 190 includes an imaging element such as a complementary metal-oxide-semiconductor field-effect transistor (CMOS) image sensor or charge-coupled device (CCD) image sensor, and converts light imaged on the imaging element into an electric signal by photoelectric conversion to output an image of a defined size.

The camera 190 outputs images at a defined rate. For example, outputting images 30 frames per second (fps).

The control unit 110 includes a central processing unit (CPU), read-only memory (ROM), random access memory (RAM), and the like. The RAM is loaded with computer programs and data stored in the ROM and the storage unit 120, and the CPU operates according the computer programs and data on the RAM so that each processing unit (the first CNN 130, the second CNN 140, the recognition results comparison unit 150, the data collection unit 160, the timing adjustment unit 170, and the additional training unit 180) is realized.

The storage unit 120 is, for example, configured as a hard disk. The storage unit 120 may be configured as a non-volatile semiconductor memory. The storage unit 120 stores a first training parameter 121, a second training parameter 122, and additional training data 123. The additional training data 123 includes a training image 123a and labeled data 123b.

1.2. CNN

Figure 2:
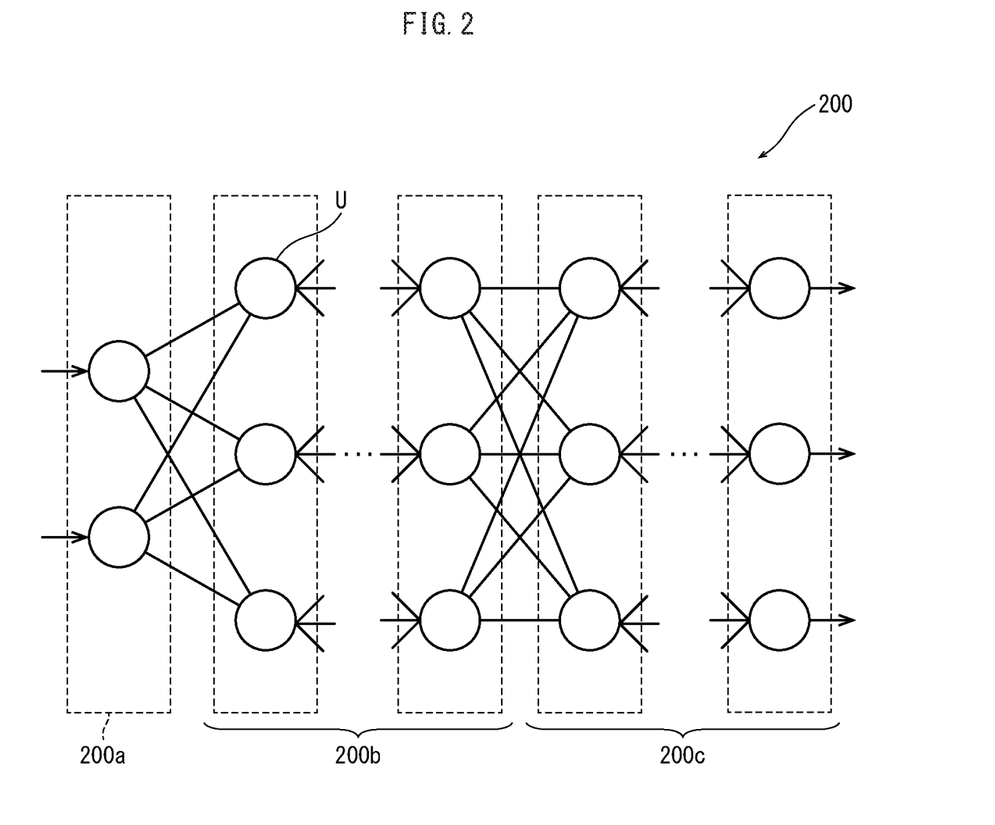
FIG. 2 is a block diagram illustrating structure of a convolutional neural network (CNN).

A neural network 200 illustrated in FIG. 2 is described as an example of a convolutional neural network.
(1) Structure of Neural Network 200

The neural network 200, as illustrated, is a hierarchical neural network that has an input layer 200a, a feature extraction layer 200b, and an identification layer 200c.

Here, a neural network is an information processing system that imitates a human neural network. In the neural network 200, an engineered neuron model corresponding to a nerve cell is here called a neuron U. The input layer 200a, the feature extraction layer 200b, and the identification layer 200c are configured to each have a plurality of neurons U.

The input layer 200a is typically one layer. Neurons U of the input layer 200a receive, for example, pixel values of pixels forming an image. Received image values are output as-is from the neurons U of the input layer 200a to the feature extraction layer 200b. The feature extraction layer 200b extracts features from data received from the input layer 200a and outputs to the identification layer 200c. The feature extraction layer 200b is sometimes called a backbone network. The identification layer 200c performs identification using features extracted by the feature extraction layer 200b.

Figure 3A:
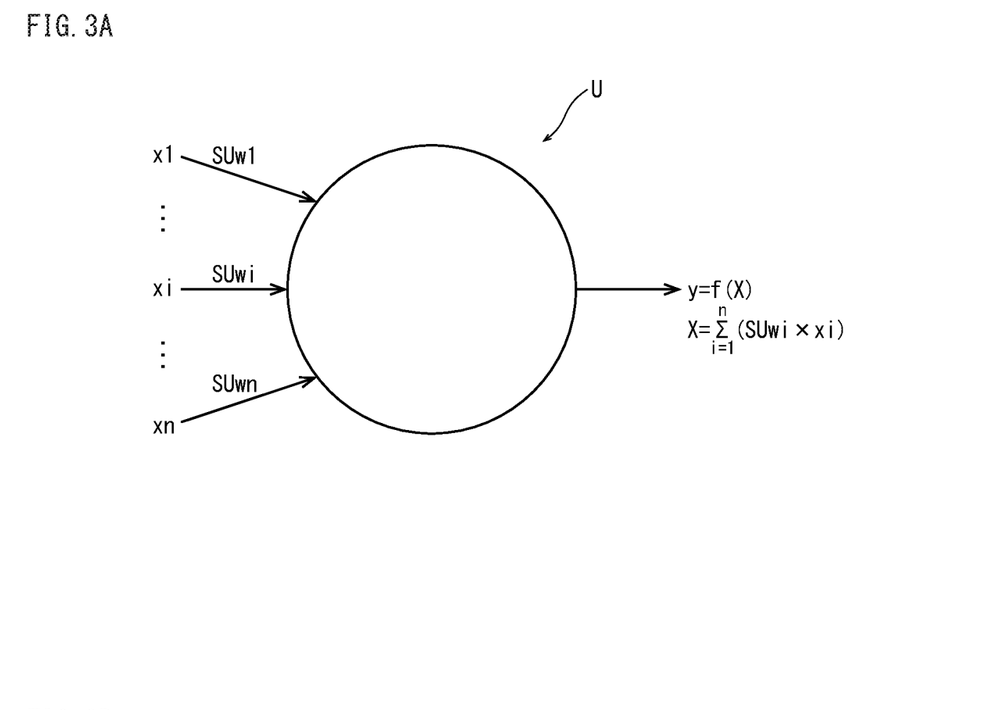
FIG. 3A is a schematic diagram illustrating one neuron U of a CNN.

As a neuron U, an element with multiple inputs and one output is normally used, as illustrated in FIG. 3A. Signals propagate in only one direction, and input signals xi(i=1, 2, ... n) are multiplied by neuron weights (SUwi) on input to a neuron U. Neuron weights can be changed through training. The neuron U outputs a sum of the input values (SUwi×xi) each multiplied by neuron weights SUwi after transformation by an activation function f(X). That is, an output value y of a neuron U is represented by the following expression.

$$y=f(X)$$

Here, $$X=\Sigma(SUwi \times xi)$$

Note that, as the activation function, for example, a ReLU or a sigmoid function can be used.

As a training method of the neural network 200, for example, an error is calculated using a defined error function between a value indicating a correct answer (labeled data) and an output value from the neural network 200, and the error is minimized by an error backpropagation method in which neuron weights of the feature extraction layer 200b and the identification layer 200c are sequentially changed using a steepest descent method or the like.

(2) Training Process

The following describes a training process of the neural network 200.

Figure 4A:
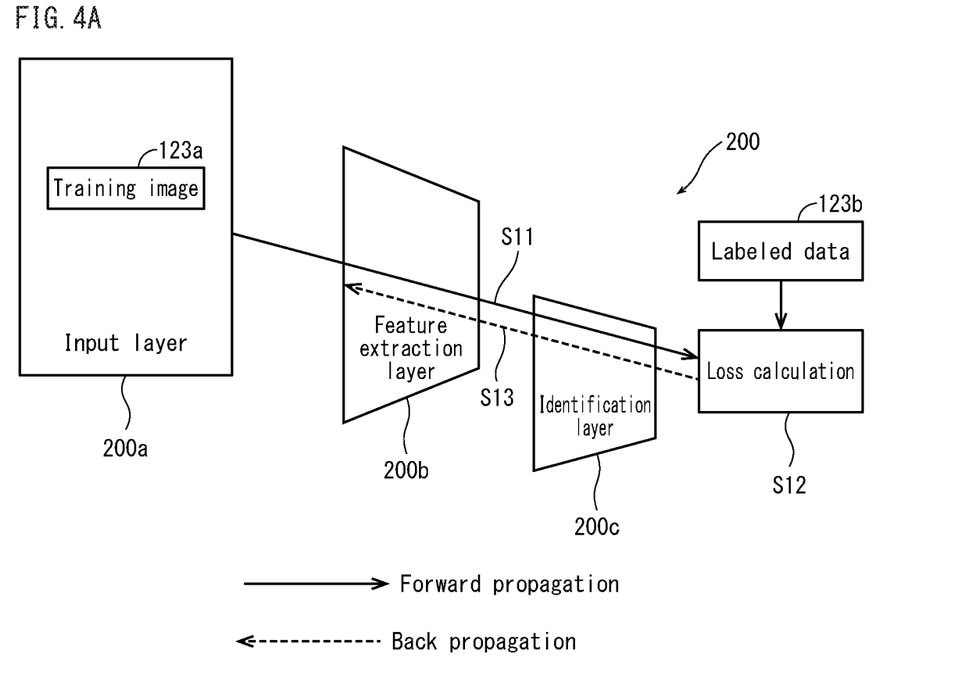
FIG. 4A is a diagram schematically illustrating data propagation during training.

A training process is a process of training the neural network 200. FIG. 4A schematically illustrates a data propagation model of training process.

Training images 123a are input to the input layer 200a of the neural network 200 image by image, and output from the input layer 200a to the feature extraction layer 200b. Each neuron U of the feature extraction layer 200b executes an operation assigning neuron weight to the input data, and outputs data indicating an extracted feature to the identification layer 200c. Each neuron U of the identification layer 200c executes an operation assigning neuron weight to the input data (step S11). This provides object estimation based on the above features. Data indicating results of object estimation is output from the identification layer 200c.

An output value of the identification layer 200c is compared to labeled data (correct data) 123b, and an error (loss) is calculated using a defined error function (step S12). In order to reduce this error, neuron weights and the like of the identification layer 200c and neuron weights and the like of the feature extraction layer 200b are sequentially changed (back propagation) (step S13). In this way, the neural network 200 is trained.

(3) Training Results

Figure 3B:
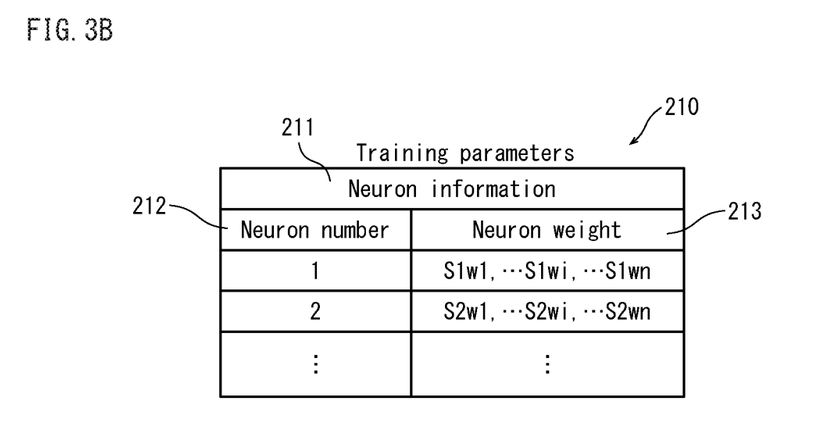
FIG. 3B is a diagram illustrating data structure of CNN trained parameters.

Training results are stored in the storage unit 120 as training parameters. FIG. 3B illustrates data structure of training parameters stored in the storage unit 120. The training parameters are composed of neuron information 211, as illustrated in FIG. 3B. Each entry of the neuron information 211 corresponds to a neuron U of the feature extraction layer 200b or the identification layer 200c.

Each entry of the neuron information 211 includes a neuron number 212 and a neuron weight 213.

The neuron number 212 is a number that identifies a neuron U of the feature extraction layer 200b or the identification layer 200c.

The neuron weight 213 is a neuron weight of a neuron U of the feature extraction layer 200b or the identification layer 200c.

A model trained in this way is called a data recognition model. A data recognition model is used to identify an object included in data.

(4) Estimation Process

The following describes an estimation process of the neural network 200.

Figure 4B:
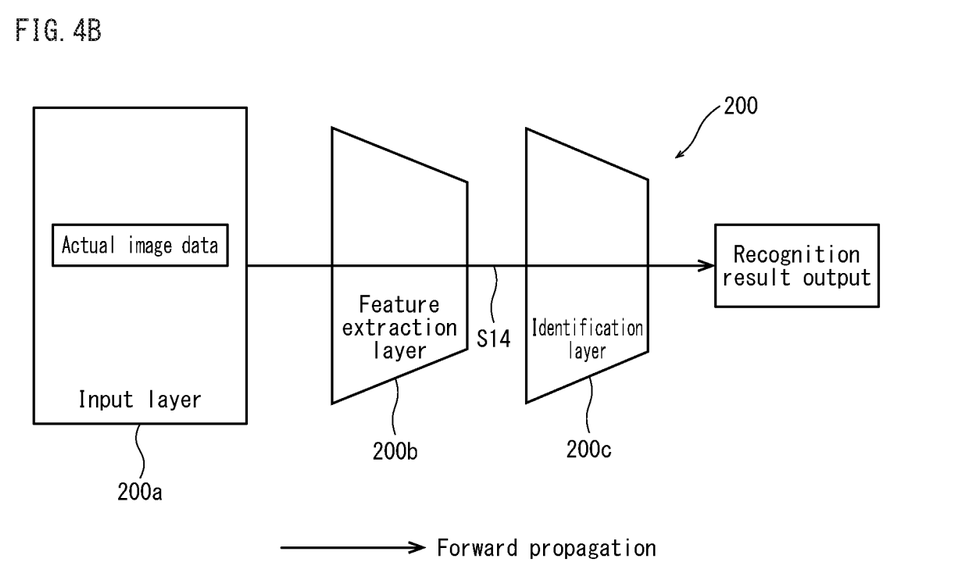
FIG. 4B is a diagram schematically illustrating data propagation during estimation.

FIG. 4B illustrates a data propagation model when estimating an object using the neural network 200 trained by the training process described above and using image data obtained by the camera 190 as input.

In the estimation process of the neural network 200, feature extraction and object estimation are executed using the feature extraction layer 200b and the identification layer 200c that have been trained (step S14).

(5) First CNN 130, Second CNN 140

The image recognition system 1 includes two image recognition units (first CNN 130, second CNN 140). The first CNN 130 and the second CNN 140 are image recognition units that execute image recognition and, for example, person detection. If a person is detected in an image input from the camera 190, a recognition result that a person is included is output, and if a person is not detected, a recognition result that a person is not included is output.

The first CNN 130 and the second CNN 140 each have the same configuration as the neural network 200. CNNs differ in recognition speed (time required to recognize one image) and recognition accuracy (accuracy with which an input image can be correctly recognized) even if trained with the same training data, depending on computational scale. Computational scale varies depending on the CNN algorithm, the number of stages of the backbone network, and the like. Accordingly, recognition speed and recognition accuracy differ depending on CNN algorithm. Further, even with the same algorithm, if the number of stages of the backbone networks are different, recognition speed and recognition accuracy will be different. In general, the larger the computational scale, the higher the recognition accuracy, but the slower the recognition speed. Conversely, the smaller the computational scale, the faster the recognition speed, bur the lower the recognition accuracy.

The larger the number of stages in the backbone network, the larger the computational scale, and the smaller the number of stages in the backbone network, the smaller the computational scale.

The first CNN 130 and the second CNN 140 have different computational scales. The computational scale of the second CNN 140 is greater than that of the first CNN 130. That is, the second CNN 140 has higher recognition accuracy than the first CNN 130 and the first CNN 130 has higher recognition speed than the second CNN 140.

The first CNN 130 is an image recognition unit that executes image recognition in real time, and has a recognition speed that can complete image recognition within intervals between images output by the camera 190. The second CNN 140 is an image recognition unit that executes image recognition only when instructed to by the timing adjustment unit 170.

The first CNN 130 and the second CNN 140 are pre-trained using the same training data, the first training parameter 121 that is a training result of the first CNN 130 and the second training parameter 122 that is a training result of the second CNN 140 are stored in the storage unit 120.

(6) Additional Training Unit 180

The additional training unit 180 executes training of the first CNN 130 using additional training data 123 stored in the storage unit 120, and updates the first training parameter 121 using training results.

1.3. Recognition Results Comparison Unit 150

The recognition results comparison unit 150 acquires recognition results of the first CNN 130 and recognition results of the second CNN 140, compares them, and outputs whether or not the recognition results match.

1.4. Data Collection Unit 160

If the result of comparison by the recognition results comparison unit 150 is that the results are different, the data collection unit 160 acquires an input image input to the first CNN 130 and the second CNN 140 and recognition results from the second CNN 140, generates additional training data 123 by using the input image as the training image 123a and the recognition results of the second CNN 140 as the labeled data 123b associated with the training image 123a, and stores the additional training data in the storage unit 120.

1.5. Timing Adjustment Unit 170

The timing adjustment unit 170 controls (determines) a timing of operation of the second CNN 140 and the additional training unit 180.

1.6. Operation

Figure 5:
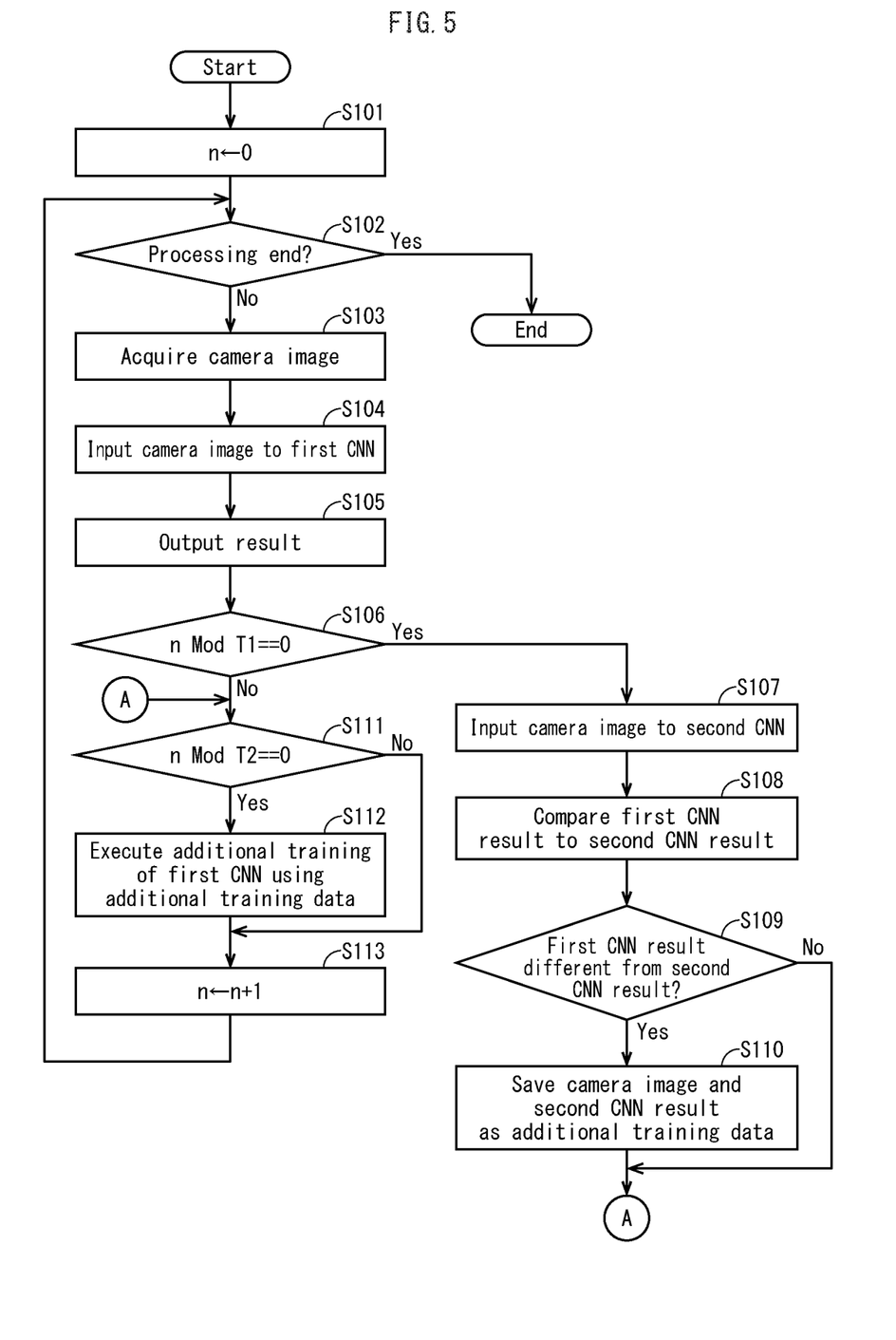
FIG. 5 is a flowchart illustrating operation of the image recognition system 1.

FIG. 5 is a flowchart illustrating operation of the image recognition system 1.

At a start of processing, the control unit 110 substitutes 0 for a control variable n indicating a frame number of an image for one frame acquired from the camera as an initial setting (step S101).

The control unit 110 determines whether or not a processing end interrupt has occurred (step S102), and if such an interrupt has occurred (step S102: Yes), ends processing.

If a processing end interrupt has not occurred (step S102: No), the control unit 110 acquires an image (camera image) of one frame from the camera 190 (step S103). The frame number of the camera image matches the control variable n. For example, when the control variable n is 1, the frame number of camera image is 1.

The control unit 110 inputs a camera image of frame number n to the first CNN 130 and causes execution of image recognition (step S104), and the first CNN 130 outputs a recognition result associated with the camera image of frame number n (step S105).

Next, the timing adjustment unit 170 determines whether or not a remainder obtained after dividing the control value n by a threshold T1 is 0 (step S106). If the determination result is true (step S106: Yes), it is determined that the second CNN 140 is to operate, and if the determination result is false (step S106: No), it is determined that second CNN 140 is not to operate. Here, the threshold T1 is a variable that specifies an interval at which the second CNN 140 is operated. When the output speed of the camera 190 is 30 fps and the threshold T1 is 1800, the second CNN 140 is operated once every 1800 frames, i.e., once every minute.

When the second CNN 140 is operated, the control unit 110 inputs the camera image of frame number n to the second CNN 140, causes image recognition to be executed (step S107), and the second CNN 140 outputs a recognition result associated with the camera image of frame number n.

The recognition results comparison unit 150 acquires recognition results associated with the camera image of frame number n from the first CNN 130 and the second CNN 140, compares them, and outputs a comparison result (step S108).

The data collection unit 160 acquires the comparison result from the recognition results comparison unit 150, and if the recognition results are different (step S109: Yes), sets the camera image of frame number n as the training image 123a, sets the recognition result of the second CNN 140 associated with the camera image of frame number n as the labeled data 123b for the training image 123a, generates additional training data 123 by combining the training image 123a and the labeled data 123b, and stores the additional training data 123 in the storage unit 120 (step S110).

Next, the timing adjustment unit 170 determines whether or not a remainder obtained after dividing the control value n by a threshold T2 is 0 (step S111). If the determination result is true (step S111: Yes), it is determined that additional training of the first CNN 130 is to be executed, and if the determination result is false (step S111: No), it is determined that additional training of the first CNN 130 is not to be executed. Here, the threshold T2 is a variable that specifies an interval at which additional training of the first CNN 140 is executed. For example, if an output rate of the camera 190 is 30 fps and the threshold T2 is 18144000, then additional training of the first CNN 130 is executed once every 18144000 (30 (frames)×60 (seconds)×60 (minutes)×24 (hours)×7 (days)) frames, i.e., once a week.

When executing additional training of the first CNN 130, the additional training unit 180 uses the additional training data 123 stored in the storage unit 120 to execute the additional training of the first CNN 130 (step S112).

The control unit 110 then substitutes n+1 for the control variable n, and repeats processing from step S102.

Note that the following two processes can be executed in parallel.

(1) Processing of steps S102 to S106 and S111 to S113.
(2) Processing of steps S107 to S110.

Therefore, while the second CNN 140 is executing image recognition for the camera image of frame number n, the first CNN 130 may be executing image recognition for camera images of frame numbers n+1, n+2,

1.8. Effects

The image recognition system 1 includes two image recognition units with different computational scales, and causes them to execute image recognition on the same camera image. When one of the recognition results by the two image recognition units is correct and the other is wrong, the input image is classified as either FP or FN by the image recognition unit that made the mistake. Here, FP means that the input image does not contain a detection target, but is identified as including a detection target, while FN means that the input image contains a detection target, but is identified as not including a detection target. In general, an object of training in image recognition is to reduce such FP and FN results. An effective method for reducing FP and FN results is add correct answers to an image classified as FP or FN, generate training data, and execute additional training, such that correct recognition can be achieved with a similar image. According to the image recognition system 1 of the present disclosure, such images classified as FP and FN can be easily collected as training data. Further, regarding correct answers, a user does not have to manually assign a correct answer and can instead use recognition results from an image recognition unit that gave a correct answer. Therefore, user burden related to the generation of training data can be reduced.

2. Supplement

Although the present invention has been described above based on embodiments, the present invention is of course not limited to the embodiments described above, and the following modifications are of course included in the technical scope of the present invention.

(1) The image recognition system 1 of embodiment 1 described above includes two image recognition units (the first CNN 130 and the second CNN 140) in the image recognition device 100 in the same housing. However, two image recognition units may be installed in different terminal devices.

Figure 6:
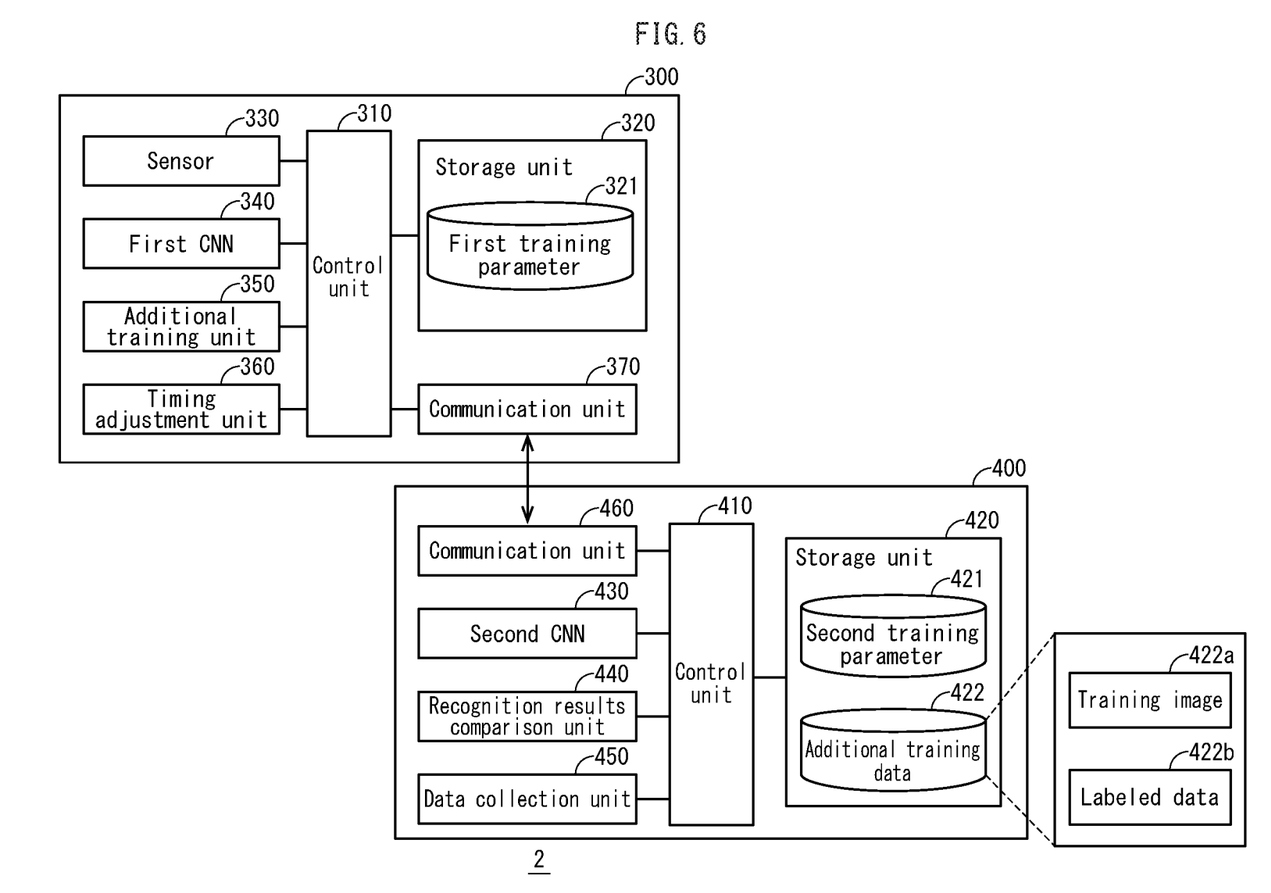
FIG. 6 is a block diagram illustrating structure of an image recognition system 2.

FIG. 6 is a block diagram illustrating structure of an image recognition system 2 in which two image recognition units are installed in different terminal devices. As illustrated, the image recognition system 2 includes an edge terminal 300 and a server terminal 400.

The edge terminal 300 includes a control unit 310, a non-volatile storage unit 320, a sensor 330, a first CNN 340 (first recognition unit), an additional training unit 350 (training unit), a timing adjustment unit 360 (timing determination unit), and a communication unit 370.

The control unit 310 is composed of a CPU, ROM, RAM, and the like. The RAM is loaded with computer programs and data stored in the ROM and the storage unit 320, and the CPU operates according to the computer programs and data on the RAM to realize each processing unit (the first CNN 340, the additional training unit 350, and the timing adjustment unit 360), and control the sensor 330 and the communication unit 370.

The storage unit 320 is, for example, configured as a hard disk. The storage unit 320 may be configured as a non-volatile semiconductor memory. The storage unit 320 stores the first training parameter 321.

The sensor 330 is an imaging element such as a CMOS image sensor or a CCD image sensor, and converts light imaged on the imaging element into an electric signal by photoelectric conversion to output an image of a defined size. The sensor 330 outputs images at a defined rate. For example, outputting images at 30 fps.

The first CNN 340 has the same configuration as the first CNN 130 of embodiment 1. The training result of the first CNN 340 is stored in the storage unit 320 as a first training parameter 321.

The additional training unit 350 executes training of the first CNN 340 using additional training data 422 received from the server terminal 400, and updates the first training parameter 321 using training results.

The timing adjustment unit 360 controls timing of operation of the additional training unit 350 and the second CNN 430 of the server terminal 400.

The communication unit 370 is a network interface that communicates with the server terminal 400. The edge terminal 300 transmits data such as an image captured by the sensor 330 and a recognition result of the first CNN 340 to the server terminal 400 via the communication unit 370. Further, the edge terminal 300 receives, for example, additional training data 422 and the like from the server terminal 400 via the communication unit 370.

The server terminal 400 includes a control unit 410, a non-volatile storage unit 420, the second CNN 430 (second recognition unit), a recognition results comparison unit 440 (comparison unit), a data collection unit 450 (collection unit), and a communication unit 460.

The control unit 410 is composed of a CPU, ROM, RAM, and the like. The RAM is loaded with computer programs and data stored in the ROM and the storage unit 420, and the CPU operates according to the computer programs and data on the RAM, to realize each processing unit (the second CNN 430, the recognition results comparison unit 440, and the data collection unit 450) and control the communication unit 460.

The storage unit 420 is, for example, configured as a hard disk. The storage unit 420 may be configured as a non-volatile semiconductor memory. The storage unit 420 stores a second training parameter 421 and additional training data 422. The additional training data 422 includes a training image 422a and labeled data 422b.

The second CNN 430 has the same configuration as the second CNN 140 of embodiment 1. The training result of the second CNN 430 is stored in the storage unit 420 as the second training parameter 421.

The recognition results comparison unit 440 has the same configuration as the recognition results comparison unit 150 of embodiment 1, acquires a recognition result of the first CNN 340 and the recognition result of the second CNN 430, compares them, and outputs a result of whether or not the recognition results match.

The data collection unit 450 has the same configuration as the data collection unit 160 of embodiment 1. As a result of the comparison by the recognition results comparison unit 440, if the results are different, the data collection unit 450 acquires the input image input to the first CNN 340 and the second CNN 430 and the recognition result of the second CNN 430, generates additional training data 422 by combining the input image as the training image 422a and the recognition result of the second CNN 430 as the labeled data 422b associated with the training image 422a, and stores the additional training data 422 in the storage unit 420.

The communication unit 460 is a network interface that communicates with the edge terminal 300. The server terminal 400 receives data such as an image captured by the sensor 330 and a recognition result of the first CNN 340 from the edge terminal 300 via the communication unit 460. Further, the server terminal 400 transmits, for example, the additional training data 422 and the like to the edge terminal 300 via the communication unit 460.

Figure 7:
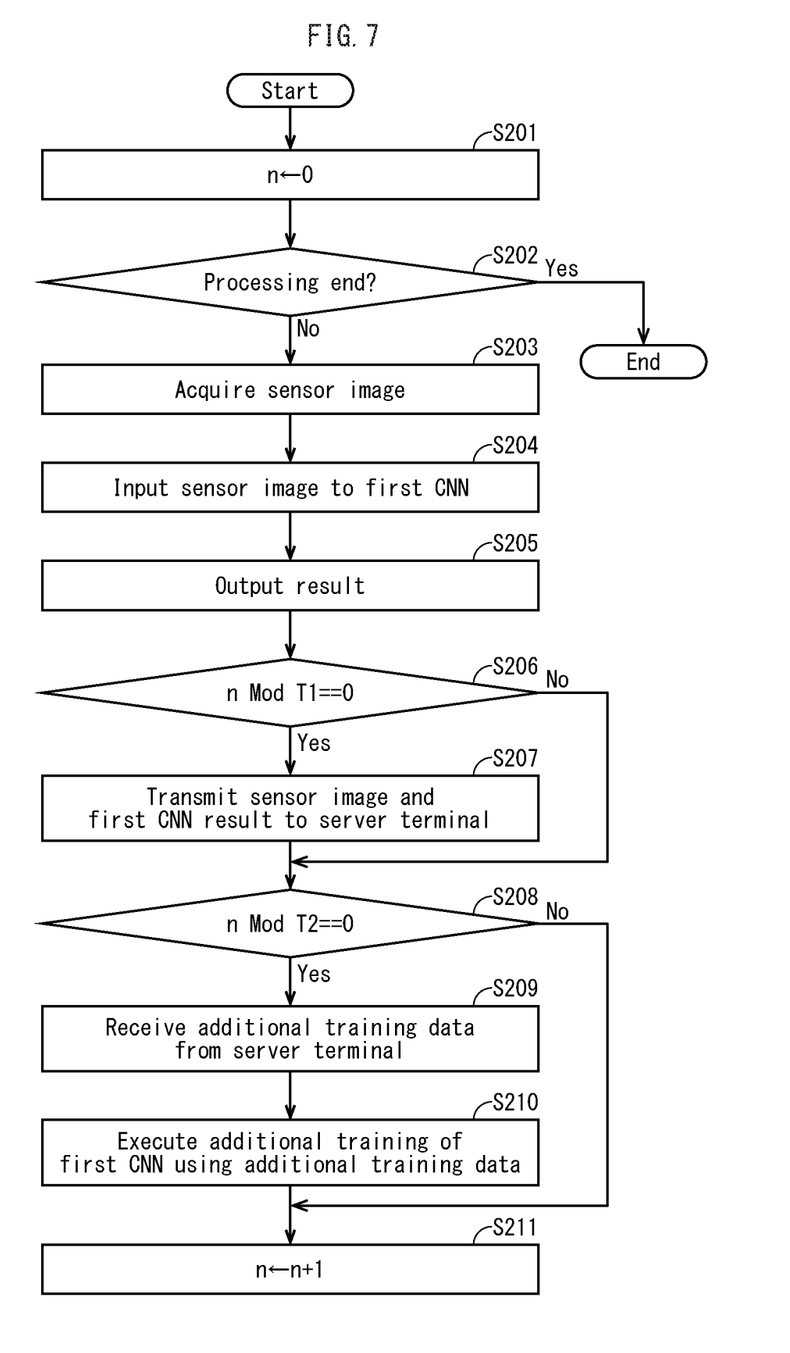
FIG. 7 is a flowchart illustrating operation of an edge terminal 300.

FIG. 7 is a flowchart illustrating operation of the edge terminal 300.

At a start of processing, the control unit 410 substitutes 0 for a control variable n indicating a frame number of an image for one frame acquired from the camera as an initial setting (step S201).

The control unit 410 determines whether or not a processing end interrupt has occurred (step S202), and if such an interrupt has occurred (step S202: Yes), ends processing.

If a processing end interrupt has not occurred (step S202: No), the control unit 410 acquires an image (sensor image) of one frame from the sensor 330 (step S203). The frame number of the sensor image matches the control variable n. For example, when the control variable n is 1, the frame number of the sensor image is 1.

The control unit 310 inputs a sensor image of frame number n to the first CNN 340 and causes execution of image recognition (step S204), and the first CNN 340 outputs a recognition result associated with the sensor image of frame number n (step S205).

Next, the timing adjustment unit 360 determines whether or not a remainder obtained after dividing the control value n by the threshold T1 is 0 (step S206). If the determination result is true (step S206: Yes), it is determined that the second CNN 430 is to operate, and if the determination result is false (step S206: No), it is determined that the second CNN 430 is not to operate.

When causing the second CNN 430 to operate, the control unit 310 transmits a sensor image of frame number n and the recognition result of the first CNN 340 associated with the sensor image of frame number n to the server terminal 400 via the communication unit 370 (step S207).

Next, the timing adjustment unit 360 determines whether or not a remainder obtained after dividing the control value n by the threshold T2 is 0 (step S208). If the determination result is true (step S208: Yes), it is determined that additional training of the first CNN 340 is to be executed, and if the determination result is false (step S208: No), it is determined that additional training of the first CNN 340 is not to be executed.

When executing additional training of the first CNN 340, the control unit 310 transmits an acquisition request for the additional training data 422 to the server terminal 400 via the communication unit 310, and receives the additional training data 422 from the server terminal 400 in response (step S209). The additional training unit 350 executes additional training of the first CNN 340 using the additional training data 422 (step S210).

The control unit 310 then substitutes n+1 for the control variable n, and repeats processing from step S202.

Figure 8:
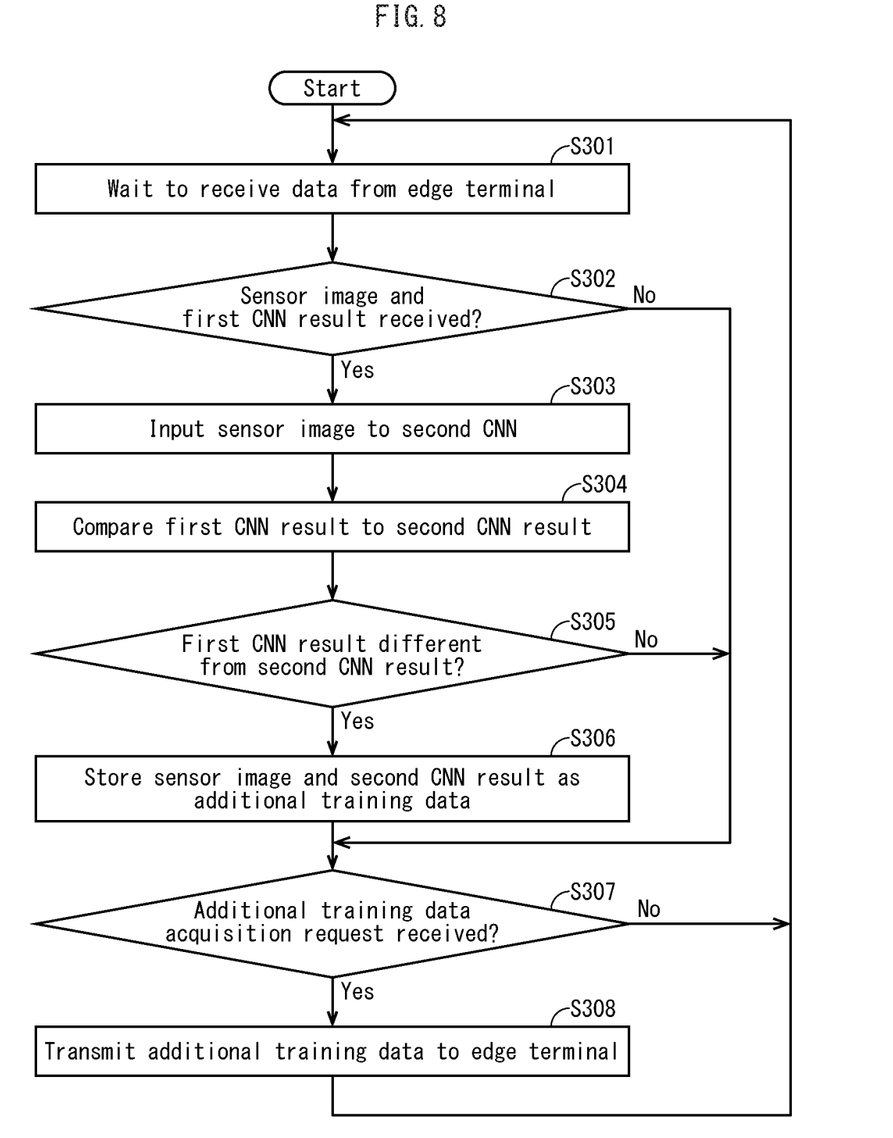
FIG. 8 is a flowchart illustrating operation of an edge terminal 400.

FIG. 8 is a flowchart illustrating operations of the server terminal 400.

The control unit 410 waits until data is received from the edge terminal 300 (step S301).

The control unit 410 determines whether the sensor image of frame number n and the recognition result of the first CNN 340 associated with the sensor image of frame number n have been received from the edge terminal via the communication unit 460 (step S302).

When receiving a sensor image of frame number n and the recognition result of the first CNN 340 associated with the sensor image of frame number n (step S302: Yes), the control unit 410 inputs the sensor image of frame number n to the second CNN 430, causes image recognition to be executed (step S303), and the second CNN 430 outputs a recognition result associated with the camera image of frame number n.

The recognition results comparison unit 440 acquires recognition results for the sensor image of frame number n from the first CNN 430 and the second CNN 430, compares them, and outputs a comparison result (step S304).

The data collection unit 450 acquires the comparison result from the recognition results comparison unit 440, and if the recognition results are different (step S305: Yes), sets the sensor image of frame number n as the training image 422a, sets the recognition result of the second CNN 430 associated with the sensor image of frame number n as the labeled data 422b associated with the training image 422a, generates the additional training data 422 by combining the training image 422a and the labeled data 422b, and stores the additional training data 422 in the storage unit 420 (step S306).

The control unit 410 determines whether or not an acquisition request for the additional training data 422 has been received from the edge terminal 300 via the communication unit 460 (step S307).

On receiving an acquisition request for the additional training data 422, the control unit 410 transmits the additional training data 422 to the edge terminal 300 via the communication unit 460 in response.

Note that here, there is one of the edge terminal 300 associated with one of the server terminal 400, but there may be a plurality of the edge terminal 300.

(2) According to an embodiment described above, the recognition result of the second CNN 140 is described as the labeled data 123b, but user input may be received and the labeled data 123b corrected based on the user input.

(3) According to an embodiment described above, the first CNN 130 and the second CNN 140 are image recognition units that detect a person, and if a person is detected in an image input from the camera 190, a recognition result that a person is included is output, and if a person is not detected, a recognition result that a person is not included is output, but a recognition result may be output as a numerical value such as a probability. In such a case, the data collection unit 160 may determine that recognition results are different when a difference between two numerical values exceeds a defined threshold and collect additional training data accordingly.

(4) According to an embodiment described above, the timing adjustment unit 170 causes operation of the second CNN 140 at defined time intervals T1, but timing for operation of the second CNN 140 is not limited to this. The timing of operation of the second CNN 140 may be changed according to the training proficiency level of the first CNN 130. For example, an interval for operation of the second CNN 140 may be shortened in early stages of training, and lengthened in late stages of training. For example, a training proficiency level may be based on a number of image recognition executions by the first CNN 130, where if the number of executions is less than a defined threshold, this is considered to be early training, and if the number of executions is greater than a defined threshold, this is considered to be late training. Further, based on a degree of matching between results of the first CNN 130 and the second CNN 140, if the degree of matching is smaller than a defined threshold, this may be considered to be early training, and if the degree of matching is greater than the defined threshold, this may be considered to be late training.

Further, user input may be received and the interval T1 set according to the user input.

(5) According to an embodiment described above, the image recognition system that executes image recognition using machine learning includes two image recognition units with different computational scales that are made to execute image recognition on the same camera image. However, the present invention is not limited to this.

(a) A target of training and recognition may be audio data. In this case, examples of audio data may be music, human voices, sounds of nature, and the like. Examples of music include classical music, folk music, pop music, and latin music. Examples of human voices include news audio, lecture audio, and conversation audio. Examples of sounds of nature include birdsong, the sound of wind, and the sound of a flowing river. In an audio recognition system that executes audio recognition using machine learning, two audio recognition units (a first recognition unit and a second recognition unit) that have different computational scales execute audio recognition with respect to the same audio data obtained from an audio input device such as a microphone. For example, if the audio data is of a human voice, a voice of a specific person may be recognized.

(b) A target of training and recognition may be character data in natural language recognition processing. In this case, examples of character data include conversation sentences, literary works, newspaper articles, and academic papers. Further, examples of conversation sentences include conversations in Japanese, English, Italian, and the like. Further, examples of literary works include poems, novels, stories, plays, reviews, and essays. Further, examples of newspaper articles include political news, economic news, and scientific news. In a natural language processing system that executes natural language recognition using machine learning, two natural language recognition units (a first recognition unit and a second recognition unit) that have different computational scales execute natural language recognition with respect to the same character data. For example, if the character data is a newspaper article, the subject and predicate may be recognized and extracted from a sentence in the newspaper article.

(6) The above embodiments and modifications may be combined.

INDUSTRIAL APPLICABILITY

A data collection device according to the present disclosure can reduce user burden associated with generating training data, and is useful as a data collection device that collects training data.

REFERENCE SIGNS

100 Image recognition device
110 Control unit
120 Storage unit
130 First CNN
140 Second CNN
150 Recognition results comparison unit
160 Data collection unit
170 Timing adjustment unit
180 Additional training unit
190 Camera

The invention claimed is:

1. A data collection device that collects training data for a data recognition model, the data collection device comprising:
   a first recognition unit, wherein the first recognition unit executes recognition processing on acquired input data and outputs a first recognition result based on the input data;
   a second recognition unit that is different from the first recognition unit, wherein the second recognition unit executes recognition processing on the input data and outputs a second recognition result based on the input data;
   a comparison unit that compares the first recognition result for the input data by the first recognition unit to the second recognition result for the input data by the second recognition unit; and
   a collection unit that collects the input data as training data according to a comparison result of the comparison unit.

2. The data collection device of claim 1, wherein
   a computational scale of the first recognition unit is smaller than a computational scale of the second recognition unit.

3. The data collection device of claim 2, wherein
   the collection unit collects the second recognition result of the second recognition unit as training data, the training data indicating labeled data associated with the input data.

4. The data collection device of claim 3, further comprising
   a training unit that executes additional training of the first recognition unit using the training data collected by the collection unit.

5. The data collection device of claim 4, wherein
   the training unit corrects the labeled data according to an external input.

6. The data collection device of claim 1, wherein
   the comparison unit determines whether or not the first recognition result of the first recognition unit and the second recognition result of the second recognition unit are different, and
   the collection unit collects the input data as the training data when the first recognition result of the first recognition unit and the second recognition result of the second recognition unit are different.

7. The data collection device of claim 1, wherein
   the comparison unit determines whether or not a difference between the first recognition result of the first recognition unit and the second recognition result of the second recognition unit is equal to or greater than a defined threshold, and
   the collection unit collects the input data as the training data when the difference is equal to or greater than the threshold.

8. The data collection device of claim 1, further comprising:
   a timing determination unit that determines a timing of operation of the second recognition unit, wherein
   the first recognition unit regularly executes data recognition, and
   the second recognition unit executes data recognition at a timing determined by the timing determination unit.

9. The data collection device of claim 8, wherein
   the timing determination unit determines the timing at fixed intervals.

10. The data collection device of claim 8, wherein
    the timing determination unit determines the timing according to a training proficiency level of the first recognition unit.

11. The data collection device of claim 8, wherein
    the timing determination unit determines the timing according to an external input.

12. The data collection device of claim 1, further comprising:
    an edge terminal comprising the first recognition unit; and
    a server terminal comprising the second recognition unit.

13. The data collection device of claim 12, further comprising:
    at least one second edge terminal, the second edge terminal comprising a recognition unit that has the same configuration as the first recognition unit.

14. The data collection device of claim 1, wherein
the first recognition unit and the second recognition unit execute image recognition, speech recognition, or natural language recognition.

15. A data collection method that collects training data for a data recognition model, the data collection method comprising:
a first recognition step of obtaining a first recognition result for acquired input data by a first recognition unit;
a second recognition step of obtaining a second recognition result for the input data by a second recognition unit different from the first recognition unit, wherein each of the first recognition unit and the second recognition unit execute recognition processing on the input data;
a comparison step of comparing the first recognition result of the first recognition unit to the second recognition result of the second recognition unit; and
a collection step of collecting the input data as training data according to a comparison result of the comparison step.

16. The data collection method of claim 15, wherein
a computational scale of the first recognition unit is smaller than a computational scale of the second recognition unit.

17. The data collection method of claim 16, wherein
the collection step collects the second recognition result of the second recognition unit as training data, the training data indicating labeled data associated with the input data.

18. The data collection method of claim 17, further comprising
additional training of the first recognition unit, executed using the training data collected in the collection step.

19. The data collection method of claim 15, wherein
the comparison step determines whether or not the first recognition result of the first recognition unit and the second recognition result of the second recognition unit are different, and
the collection step collects the input data as the training data when the first recognition result of the first recognition unit and the second recognition result of the second recognition unit are different.

20. The data collection method of claim 15, wherein
the comparison step determines whether or not a difference between the first recognition result of the first recognition unit and the second recognition result of the second recognition unit is equal to or greater than a defined threshold, and
the collection step collects the input data as the training data when the difference is equal to or greater than the threshold.

21. The data collection method of claim 15, wherein
the first recognition unit regularly executes data recognition, and
the second recognition unit executes data recognition at a defined timing.

* * * * *